UNITED STATES PATENT OFFICE.

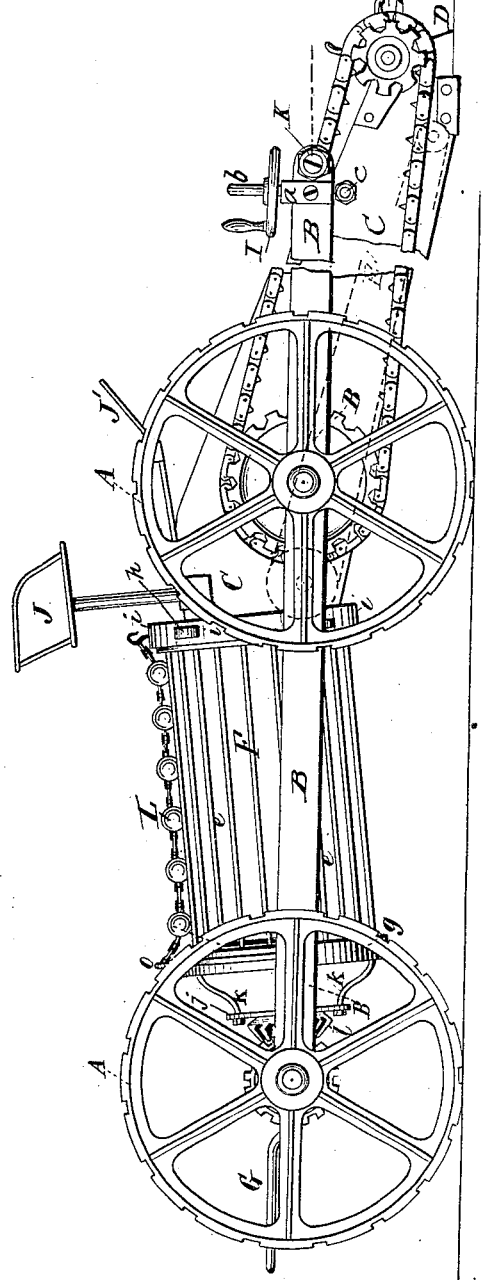

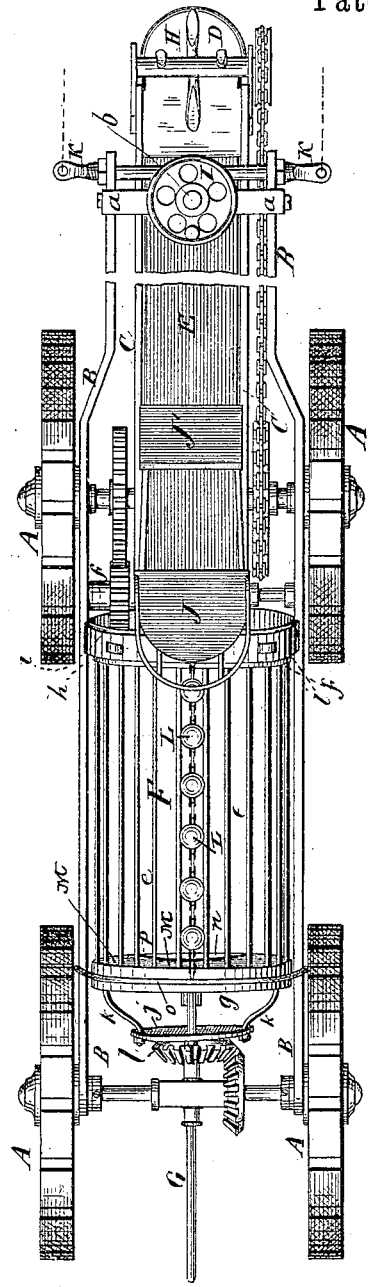

ROBERT A. CLARK, OF LIVERPOOL, COUNTY OF LANCASTER, ENGLAND.

POTATO DIGGING AND SEPARATING MACHINERY.

SPECIFICATION forming part of Letters Patent No. 271,601, dated February 6, 1883.

Application filed March 25, 1882. (No model.) Patented in England February 17, 1881, No. 699.

*To all whom it may concern:*

Be it known that I, ROBERT ALEXANDER CLARK, a subject of the Queen of Great Britain, residing at Liverpool, in the county of Lancaster, in the Kingdom of England, have invented certain new and useful Improvements in Potato Digging and Separating Machinery, (for which I have received Letters Patent in England, No. 699, dated February 17, 1881,) of which the following is a specification.

My invention relates to that class of potato digging and separating machinery in which the potatoes and earthy matters, after being dug up, are passed by means of a revolving belt into a riddle, and are there separated from each other, the objects of the improvements being to simplify and arrange the various parts whereby such machinery shall work in a much better manner than heretofore; and in order that my invention may be fully understood I have annexed hereto, and which are to be considered as forming part of the same, the accompanying sheets of drawings, on which—

Figure 1 is an elevation of a machine embodying my improvements; Fig. 2, a plan of Fig. 1.

Similar letters refer to similar parts in each figure.

A A A A are the four driving-wheels of the machine, to the axles of which the shafts B B, forming the frame of the machine, are attached; B B, shafts forming the frame of the machine. To the front ends of these shafts a cross-bar, *a*, is attached, through which cross-bar a screw, *b*, passes. The lower end of this screw is attached to a tie-rod, *c*, passing through the trough C. By depressing the screw *b* by means of the hand-wheel I, hereinafter mentioned, the trough can be lowered to its work.

C is the trough up which the potatoes and earthy matters pass after being dug up by means of spade D.

D is the spade for digging up the potatoes. This spade is attached to the lower end of trough C in any suitable manner. The upper end of the trough C passes into the riddle F, hereinafter described, and is sustained in an elevated position by means of the axle of the front pair of driving-wheels.

E is the endless revolving belt, by means of which the potatoes and the earthy matters are passed up trough C into riddle F.

F is the riddle, of any ordinary construction. The one shown in the drawings consists of a series of rods, *e*, arranged in and around two hoops, *f g*. The hoop *f* is supported by and revolves on rollers *h*, these rollers in their turn being supported in a hoop, *i*, attached to the shafts B B. The hoop *g* is attached to a circular plate, *j*, by means of arms *k*, the plate *j* in its turn being attached to bevel-wheel *l*, which rotates on shaft G.

G is a shaft supported by a bearing in the axle of the rear pair of driving-wheels. One end of this shaft serves as a lever to assist in turning the machine round, while to the other end a plate, M, is attached. This plate covers the rear end of the riddle; but an opening, *n*, is allowed for removing the potatoes.

H is a finger-wheel revolving in front of the machine. This wheel is placed just above the spade D, and serves to assist the potatoes onto the revolving belt E.

I is a hand-wheel, by means of which the screw *b* is depressed, thus lowering the trough and with it the spade to its work.

J is the seat, and J' foot-rest, for the person in charge of the machine; K, the bar to which the traces of the animal drawing the machine are attached.

The mode of action is as follows: The spade D being first lowered to its work by means of twisting the hand-wheel I, the machine is then set in motion. As the machine moves forward the potatoes dug up by spade D are transferred, by means of revolving finger-wheel H, to revolving belt E. The finger-wheel H is revolved by means of chain-gearing driven from axle of the front pair of driving-wheels, as shown. The belt E is caused to revolve by means of toothed wheels, also driven from the front axle, as shown. The potatoes and the earthy matters dug up with them are carried up trough C by means of revolving belt E, and from thence fall into revolving riddle F. This riddle F is caused to revolve by means of bevel-gearing driven from rear axle, as shown. The potatoes, after being separated from the earthy matters, can be removed from riddle F through opening *n* at rear of machine.

L is a chain of balls knocking the sides of the riddle as it revolves, and fastened at one end to hoop *i* and at the other to a rung, *o*, which rung is fastened to the sides of the shafts B B. The object of this chain of balls is to remove from the bars of the riddle any earthy matters that may have adhered to the same.

I claim as my invention—

1. In a potato-digging machine, a rotary reel supported at its forward end by external bearing-rollers, and at its rear end by a central shaft carrying the gear-wheel through which motion is imparted to the reel.

2. In a potato-digging machine, the combination of the riddle with backwardly-projecting arms k, and plate j, protecting the bevel-gear from dirt escaping from the riddle, and the gearing l, substantially as shown.

3. In a potato digging and separating machine, the combination of the spade D, belt E and riddle F, and the finger-wheel H, arranged substantially as shown and described, whereby it is adapted to assist the belt in moving the potatoes to the reel.

4. In a potato-digging machine, the combination, with a revolving reel, of a chain of balls lying upon the exterior of the reel and adapted to fall against the bars, and thus to relieve them of adhering matter.

5. In a potato-digging machine, the combination of a digging and separating mechanism and an elevating mechanism, substantially such as shown and described, separately driven from independent parts of the machine, whereby the motion of one may be rapid or slow without affecting the motion of the other.

ROBERT ALEXANDER CLARK.

Witnesses:
I. O. O'BRIEN,
JOHN HAYES.